United States Patent
Balinsky et al.

(10) Patent No.: US 8,984,298 B2
(45) Date of Patent: Mar. 17, 2015

(54) MANAGING ACCESS TO A SECURE CONTENT-PART OF A PPCD USING A KEY RESET POINT

(75) Inventors: Helen Balinsky, Cardiff (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 13/192,205

(22) Filed: Jul. 27, 2011

(65) Prior Publication Data

US 2013/0031369 A1 Jan. 31, 2013

(51) Int. Cl.
  H04L 9/32 (2006.01)
  H04L 9/14 (2006.01)
  G06F 21/62 (2013.01)
  H04L 9/08 (2006.01)

(52) U.S. Cl.
  CPC .......... *H04L 9/088* (2013.01); *G06F 21/6209* (2013.01)
  USPC ............ 713/189; 713/168; 713/176; 713/180

(58) Field of Classification Search
  CPC ........................ G06F 21/6209; H04L 9/088
  USPC ............ 713/168, 176, 189; 380/277; 726/2, 4
  See application file for complete search history.

(56) References Cited

U.S. PATENT DOCUMENTS

| | | | |
|---|---|---|---|
| 6,157,722 A * | 12/2000 | Lerner et al. | 380/260 |
| 7,386,724 B2 | 6/2008 | Coldicott et al. | |
| 7,496,767 B2 | 2/2009 | Evans | |
| 7,587,368 B2 | 9/2009 | Felsher | |
| 7,831,827 B2 | 11/2010 | Walmsley | |
| 7,831,829 B2 | 11/2010 | Appenzeller et al. | |
| 7,870,386 B2 * | 1/2011 | Forlenza et al. | 713/165 |
| 7,954,135 B2 * | 5/2011 | Simpson et al. | 726/1 |
| 8,045,714 B2 * | 10/2011 | Cross et al. | 380/277 |
| 8,225,083 B2 * | 7/2012 | Ganesan et al. | 713/150 |
| 2003/0135464 A1 * | 7/2003 | Mourad et al. | 705/50 |
| 2003/0217264 A1 * | 11/2003 | Martin et al. | 713/156 |
| 2005/0097056 A1 * | 5/2005 | DeMello et al. | 705/57 |
| 2005/0246526 A1 * | 11/2005 | Forlenza et al. | 713/165 |
| 2006/0047977 A1 | 3/2006 | Hanasaki | |
| 2006/0179309 A1 * | 8/2006 | Cross et al. | 713/168 |
| 2009/0024846 A1 * | 1/2009 | Ganesan et al. | 713/162 |
| 2009/0150761 A1 | 6/2009 | Sawicki et al. | |
| 2009/0220089 A1 * | 9/2009 | Venkatraman et al. | 380/277 |
| 2010/0046749 A1 | 2/2010 | Hatano et al. | |
| 2011/0085664 A1 * | 4/2011 | Cross et al. | 380/277 |

* cited by examiner

*Primary Examiner* — Linglan Edwards

(57) ABSTRACT

In a method for managing access to a secure content-part of a PPCD, a key reset point of the secure content-part during a workflow among workflow participants is determined. In addition, key-map files comprising subsets of access keys that provide access to the secure content-part during respective content access sessions are generated, in which at least one of the key-map files corresponds to the key reset point and comprises a first decryption key, a first verification key, a second encryption key, and a second signature key, in which the first decryption key does not correspond to the second encryption key, and in which the first verification key does not correspond to the second signature key. In addition, the plurality of key-map files are supplied to at least one of the participants.

15 Claims, 7 Drawing Sheets

MANAGING ACCESS TO A SECURE CONTENT-PART OF A PPCD USING A KEY RESET POINT

CROSS REFERENCE TO RELATED APPLICATIONS

The present application contains common subject matter with copending and commonly assigned PCT Application Serial No.: PCT/US10/49638, titled "Providing Differential Access to a Digital Document", filed on Sep. 21, 2010, U.S. patent application Ser. No. 12/949,510, titled "Managing Access to a Secure Digital Document", filed on Nov. 18, 2010, U.S. patent application Ser. No. 13/014,062, titled "Managing Information in a Document Serialization", filed on Jan. 26, 2011, U.S. patent application Ser. No. 13/050,888, titled "Document Management System and Method", filed on Mar. 17, 2011, U.S. patent application Ser. No. 13/106,354, titled "Managing Sequential Access to Secure Content Using an Encrypted Wrap", filed on May 12, 2011, and U.S. patent application Ser. No. 13/192,189, titled "Managing Access to A Content-Part of a PPCD Following Introduction of the PPCD into a Workflow", filed on Jul. 27, 2011, the disclosures of which are hereby incorporated by reference in their entireties.

BACKGROUND

In recent years, there has been a growing trend to move away from printing information on paper and instead, to the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may readily be counterfeited.

Various techniques have been proposed to prevent or reduce attacks and counterfeiting of digital documents. These techniques typically employ a database, such as, but not limited to filesystem, Microsoft Sharepoint®, etc., upon which the digital documents are stored so that access to the database, or a network to which the database is connected, is controlled by preventing access to the database or network to a user unless that user possesses some secret information, such as a user identification and password. As such, in order for these security techniques to enforce access control on the digital documents, users are required to be granted access to the database or network.

BRIEF DESCRIPTION OF THE DRAWINGS

Features of the present disclosure will become apparent from the following description with reference to the figures, in which.

DETAILED DESCRIPTION

Figure 1:
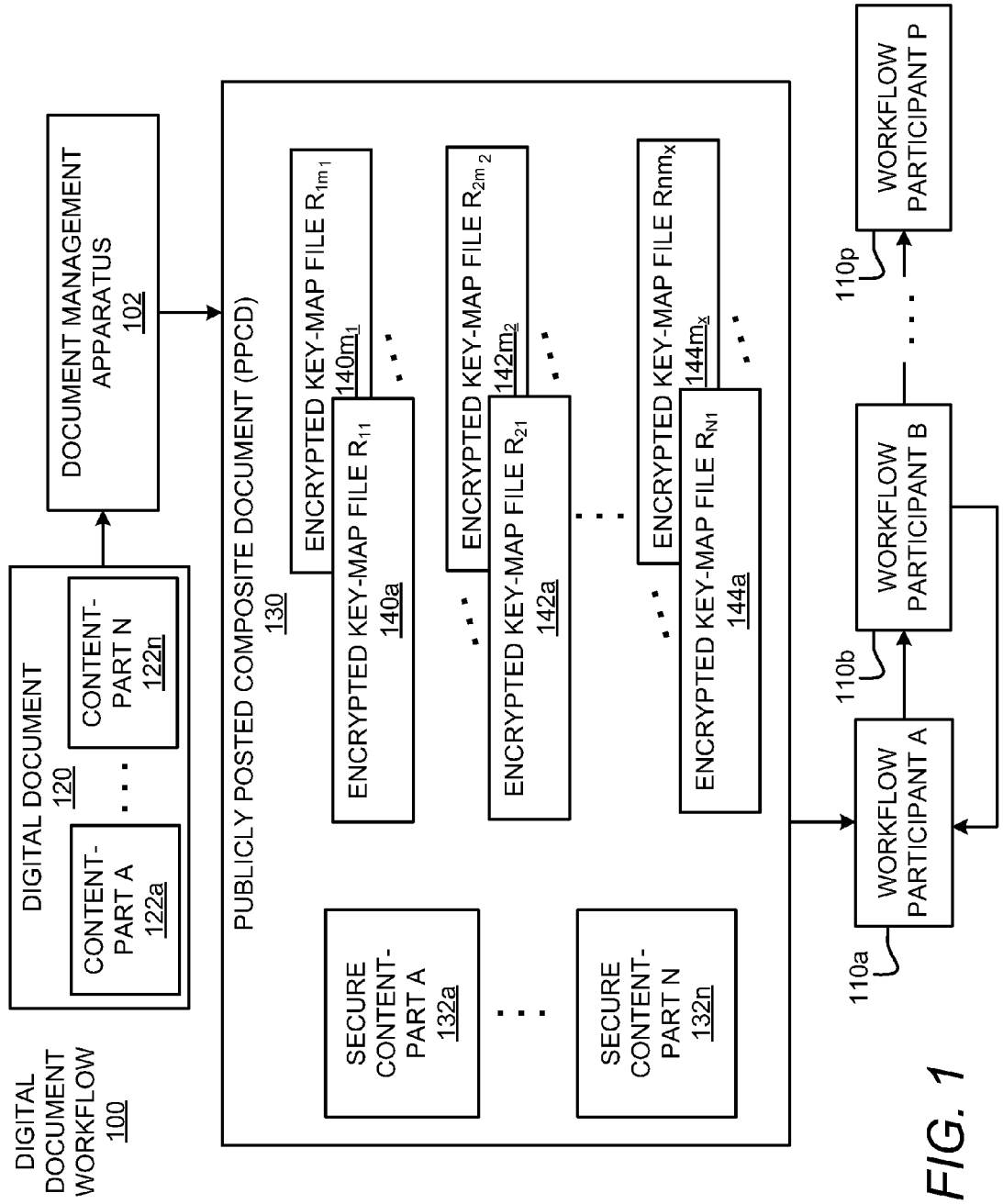
FIG. 1 illustrates a simplified schematic diagram of a digital document workflow, according to an example of the present disclosure.

For simplicity and illustrative purposes, the present disclosure is described by referring mainly to an example thereof. In the following description, numerous specific details are set forth to provide a thorough understanding of the present disclosure. However, it will be apparent that the present disclosure may be practiced without limitation to these specific details. In other instances, some methods and structures have not been described in detail so as not to unnecessarily obscure the present disclosure.

Throughout the present disclosure, the terms "n", "m", "p", and "x" following a reference numeral is intended to denote an integer value that is greater than 1. In addition, ellipses (" . . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a document management apparatus and a method for managing access to a secure content-part of a publicly posted composite document (herein after referred to as a "PPCD") following introduction of the PPCD into a workflow among a plurality of workflow participants (herein after referred to as "participants"). The participants may be granted various types of access rights to the secure content-part as the PPCD progresses along a workflow. In addition, the access rights for the participants may remain the same at various stages (or content access sessions) of the workflow or the access rights may be modified at some point along the along the workflow. Each content access session, which is defined herein as each time a participant accesses the PPCD, begins with a participant receiving the PPCD and ends with the participant transmitting the PPCD to the next participant. In order for the participant to have a predetermined type of access right to the secure content-part during a particular content access session, the participant is supplied with the corresponding subset of keys for the secure content-part for that content access session.

The participants are nominally to discard the keys at the end of each content access session. However, because the participants access the secure content-part outside of a secure environment, this policy may not be guaranteed. As such, the participants may accidentally or maliciously retain the keys, thus potentially granting the participants unauthorized access to future versions of the secure content-part to which the participants had access during a prior content access session. In addition, the participants may have unauthorized access to past versions of the secure content-parts.

This problem may become exacerbated in instances where the participants have more than one content access session with different access rights during a workflow. For example, an employee may be asked to contribute to some content-part of a PPCD. Following the employee's contribution, the content part may be approved by his manager, and the employee is no longer allowed to modify this content part, whilst being asked to contribute to other content parts of the same PPCD. In addition, the list of workflow participants authorized to access a content part may change after certain content access sessions. For instance, some new participants, who previously could access this content part may no longer retain the access right, whilst others may not be granted access.

In this regard, and as discussed in greater detail herein below, the access rights to the secure content-part by the participants may be reset or granted to substantially prevent the participants from gaining unauthorized access to the secure content-part. More particularly, access to the secure content-part may be reset to revoke previously granted access and prevent a participant from being able to exercise his previously granted access to the secure content-part after some workflow point (key reset point), such as, for instance, after sensitive data has been added. In addition, access to the secure content-part may be reset to grant a new access without giving retrospective access to the previous versions of a secure content-part. For instance, if a secure content-part remains protected by the same keys, giving the secure content-part's key to a participant at a later point will automatically grant access to the previous versions of the secure content-part.

Although the resetting of the keys may be performed by importing the PPCD back into a secure environment and updating its keys to reflect the new access requirements, this may complicate the workflow. As such, the document management apparatus disclosed herein is to enable access rights of predetermined ones of the participants to be reset or granted without requiring that the PPCD be imported back into the secure environment. More particularly, the document management apparatus is to provide a participant with the ability to reset the keys for at least another one of the participants. In addition, the participants that have been granted Read-Write (or modify) access to the secure content-part may be granted the ability to reset the keys. However, participants that have been granted Read Only or Verify Access access to a secure content-part cannot change the part and as such cannot change the part sensitivity nor do they require the ability to reset the part access.

As used throughout the present disclosure, a PPCD comprises a digital document that contains at least one content-part that has been encrypted and signed to substantially prevent unauthorized access to the content-part(s). The content-part(s) may comprise a variety of individual addressable and accessible parts (units) in the form of separate files or addressable file fragments. For example, the units may include individual files, groups of files, or file fragments, such as, html fragments, xml nodes, presentation slides, word processing text boxes, parts of a spreadsheet document, an electronic object containing drawings, an electronic object having flash video capabilities, etc., and combinations of different types of units. In addition, the content-parts of a particular digital document may comprise the same format or different formats from each other or a single content-part may include fragments and files having different formats from each other as described for instance, in the Ser. No. 13/106,354 application for patent.

As also disclosed herein, access to the secure content-part by the participants may be controlled through distribution of various sets of keys contained in respective key-map files for the participants. More particularly, a subset of the keys may be contained in key-map files within a PPCD, with at least one key-map file entry for each participant. Thus, for a relatively large workflow there may be a large number of separate key-map files in a PPCD, which is equal to or larger than the number of participants that are to receive the secure content. As discussed in greater detail herein below, each key-map file is encrypted and is intended to be decrypted only by the intended participant.

In one example, each of the key-map files is encrypted using a respective public key of a participant who is intended to access the keys contained therein. In another example, each of the key-map files is encrypted using a symmetric key generated or derived for the respective participants and the symmetric keys are encrypted using the respective public keys of the participants.

In either of the examples above, at least one of the participants is provided a set of keys that enables the participant(s) to decrypt a secure content-part and to re-encrypt the secure content-part using an encryption key that does not match the key used to decrypt the secure content-part. By encrypting the secure content-part using a different encryption key, the participant resets access to the secure content-part by requiring a matching decryption key to access the secure content-part. In this regard, and as used throughout the present disclosure, the content access session (workflow part) at which the keys required to access the secure content-part are reset is recited as a key reset point.

Through implementation of the method and apparatus disclosed herein, the same participant may be given different access rights to secure content-parts of a PPCD at different stages (or content access sessions) of a workflow, while the PPCD remains outside of a secure environment. In this regard, the participant may be prevented from using old access keys to access the versions of the secure content-parts of the PPCD to which the participant's access rights have been changed or revoked. In addition, the method and apparatus disclosed herein enable access rights to be granted to participants starting from various stages of the workflow without automatically giving the participants access to previous versions of the secure content-parts of the PPCD.

With reference first to FIG. 1, there is shown a simplified diagram of a digital document workflow 100, according to an example. It should be readily apparent that the diagram depicted in FIG. 1 represents a generalized illustration and that other components may be added or existing components may be removed, modified or rearranged without departing from a scope of the digital document workflow 100.

The digital document workflow 100 is depicted as including a document management apparatus 102, a plurality of participants 110a-110p, a digital document 120 containing a plurality of content-parts 122a-122n, and a PPCD 130. The PPCD 130 is also depicted as containing a plurality of secure (encrypted and signed) content-parts 132a-132n and secure (encrypted and signed) key-map files $R_{ij}$ 140a-144$m_X$. In the key-map files $R_{ij}$, the subscript "i" denotes the participant and the subscript "j" denotes the content access session or workflow step. In addition, the PPCD 130 comprises a serialization comprising the secure content-parts 132a-132n and the secure key-map files $140a$-$144m_X$. In other examples, the serialization also includes an entry-table that indicates which of the symmetric keys are associated with which of the participants to enable the participants to quickly identify which of the symmetric keys they are able to decrypt using their respective private keys. Examples of the entry table may be found in the Ser. No. 13/014,062 application for patent.

The document management apparatus 102 may comprise a hardware device, such as, a computer, a server, a circuit, etc., to perform various functions in encrypting and signing the content-parts $132a$-$132n$ and the key-map files $140a$-$144m_X$ to control access to the secure content-parts $132a$-$132n$ by the participants $110a$-$110p$. Various functions that the document management apparatus 102 may perform are discussed in greater detail herein. The participants $110a$-$110p$ generally represent computing devices through which the participants $110a$-$110p$ may receive, and when granted sufficient access, to at least one of view, edit, verify authenticity and/or acknowledge receipt of the PPCD 130. The computing devices may comprise, for instance, personal computers, laptop computers, tablet computers, personal digital assistants, cellular telephones, etc.

The document management apparatus 102 may be in a secure environment where the digital document owner/creator/master has access to the document management apparatus 102, and at least one of the computing devices of the participants $110a$-$110p$ is outside of the secure environment. In other words, some or all of the participants $110a$-$110p$ may not access the PPCD 130 from a common database that controls access to the secure content-parts $132a$-$132n$ of the PPCD 130. Instead, the PPCD 130 may be supplied to and among the participants $110a$-$110p$ through, for instance, e-mail, a shared server, direct file transfer, removable storage medium, cloud service, etc. In addition, some or all of the participants $110a$-$110p$ may not be granted access to the secure environment of the document management apparatus 102 in instances where such access is impractical or prohibited.

The digital document 120 may comprise any reasonably suitable type of document in a digital form and may comprise at least one digital document, which may be in the same or different formats with respect to each other. Examples of suitable document types include, for instance, portable document format, spreadsheet, JPEG or any other image, word processing document, hypertext markup language (html), etc. In addition, the content-parts $122a$-$122n$ generally comprise individual addressable elements within the digital document 120, such as, signature lines, cells or columns within a spreadsheet, paragraphs, graphics boxes, etc. As another example, the content-parts $122a$-$122n$ may comprise logical aggregations of parts from multiple digital documents. As a further example, digital documents may be in multiple content-parts $122a$-$122n$.

The document management apparatus 102 may encrypt and sign the content-parts $122a$-$122n$ using various sets of keys as discussed in greater detail herein below. In this regard, the document management apparatus 102 may generate (or derive) needed encryption and signature keys, encrypt and sign the content-parts $122a$-$122n$ and may supply the generated PPCD 130, which comprises the secure content-parts $132a$-$132n$, and may comprise the encrypted key-map files $140$-$144m_X$, to at least one of the participants $110a$-$110p$.

The document management apparatus 102 may also determine at least one key reset point at which the keys required to access at least one of the secure content-part(s) $132a$-$132n$ is reset. More particularly, for instance, the document management apparatus 102 may determine at which point access to the secure content-part(s) $132a$-$132n$ is to change and therefore require participants to have a different set of keys to access the secure content-part(s) $132a$-$132n$. In one regard, the document management apparatus 102 may determine that any participant $110a$-$110p$ that is given read-write access to the secure content-part(s) at a workflow step may be granted rights to be a key reset point. In addition, the document management apparatus 102 may determine that a plurality of participants $110a$-$110p$ are to be granted rights to act as key reset points in the workflow.

According to an example, the document management apparatus 102 may assign a particular participant $110p$ to be a key reset point for a particular secure content-part $132a$ if there is at least one participant $110p-1$ that is to access the secure content-part $132a$ prior to the particular participant $110p$ in the workflow, but is to have a lesser access right to the secure content-part $132a$ after the particular participant $110p$ in the workflow. For instance, the at least one participant $110p-1$ may have originally been granted Read-Write access but may only have Read Only access following the key reset point. In another example, the document management apparatus 102 may assign a particular participant $110p$ to be a key reset point if there is at least one participant $110p+1$ that is to access the secure content-part $132a$ after the particular participant $110p$ in the workflow, but is not to access the secure content-part $132a$ before the particular participant $110p$ in the workflow.

In the examples above, it should be noted that the document management apparatus 102 may assign a particular participant $110p$ to be a key reset point for the secure content-part $132a$ at a particular workflow step where the participant has read-write access for the secure content-part $132a$. In addition, a plurality of key reset points may be determined for the same secure content-part $132a$ to be implemented either by the same participant or by different participants.

Following determination of the key reset point(s), the document management apparatus 102 is to assign and distribute the access keys accordingly to control access to the versions of the secure content-part $132a$ before and after the key reset point(s). More particularly, for each secure content-part $132a$ that along the entire workflow has N key reset points, the document management apparatus 102 assigns N+1 encryption/decryption pairs and N+1 signature/verification pairs. According to an example, for each secure content-part $132a$ for which a key reset point is assigned, the document management apparatus 102 assigns 2 pairs of encryption/decryption keys and 2 pairs of signature/verification keys. In this example, one of the pairs of encryption/decryption keys does not correspond to the other one of the pairs of encryption/decryption keys. In addition, one of the pairs of signature/verification keys does not correspond to the other one of the pairs of signature/verification keys. The first pair of encryption/decryption keys and thus the first pair of signature/verification keys are used at all steps before the key reset point. At the key reset point the secure content-part $132a$ is verified and decrypted using the corresponding keys from the first pair. At the same key reset point, the secure content-part $132a$ is encrypted and signed using the keys from the corresponding second pair assigned to this secure content-part $132a$ by the document management apparatus 102. The keys from the second pairs are used for all subsequent steps following the key reset point.

The document management apparatus 102 may distribute the encryption/decryption pairs in the following manner. The participant $110p$ at the i key reset point receives decryption key i, signature verification key i, encryption key (i+1) and signature key (i+1). As such, the participant $110p$ is able to verify the secure content-part 132a as the secure content-part 132a was encrypted and signed before the key reset point using the keys (i). In addition, the participant 110p is able to re-encrypt and re-sign the secure content-part 132a using the new keys (i+1). As such, the participants 110a-110p-1 with past access can no longer access the secure content-part 132a following the key reset point. Likewise, the participants 110p+1 with the new keys will not be able to access versions of the secure content-part 132a prior to the key reset point.

In this regard, the document management apparatus 102 may distribute the matching pairs of verification and signature keys i and matching pairs of encryption and decryption keys i to the participants that are to receive the secure content-part 132a between the (i−1) and i key reset points.

The document management apparatus 102 may include the respective sets of keys into the key-map files key-map files $R_{ij}$ 140a-144$m_X$. According to an example, each set of encrypted key-map files $R_{11}$, $R_{12}$, $R_{13}$, $R_{14}$ ... $R1_{m1}$ 140a-140$m_1$, $R_{21}$, $R_{22}$, $R_{23}$, $R_{24}$ ... $R1_{m2}$ 142a-142$m_2$, $R_{N1}$, $R_{N2}$, $R_{N3}$, $R_{N4}$ ... $R1_{Nm}$ 144a-144$m_X$ is associated with a particular participant 110a-110p. In this example, for instance, a first set of encrypted key-map files 140a-140$m_1$ is associated with a first participant 110a, a second set of encrypted key-map files 142a-142$m_2$ is associated with a second participant 110b, and so forth. In addition, each of the encrypted key-map files $R_{1m1}$ 140a-140$m_1$ in a particular set contains a set of keys to enable access by the participant 110a (i) to the content-part 132a during a particular content access session (j). Although each of the sets of encrypted key-map files 140a-140$m_1$, 142a-142$m_2$, 144a-144$m_X$ has been described as being associated with each of the participants 110a-110p, it should be understood that at least one of the participants 110a-110p may be associated with a single encrypted key-map file, for instance, when the participant 110a is to access the secure content-part 132a once during a workflow. In addition, the encrypted key-map files 140a-144$m_X$ may randomly be ordered with respect to each other in the PPCD serialization to prevent determination of the order of the participants 110a-110p from the listing of the encrypted key-map files 140-144$m_X$.

According to an example, the key-map files 140a-144$m_X$ may be encrypted through use of respective symmetric keys generated and/or derived for each of the key-map files 140a-144$m_X$. In this example, the respective symmetric keys may be encrypted through use of the public keys of the participants 110a-110p. According to an example, the encrypted symmetric keys may be combined into an entry table that indicates which of the symmetric keys are associated with which of the participants to enable the participants to quickly identify which of the symmetric keys they are able to decrypt using their respective private keys. Examples of the entry table may be found in the Ser. No. 13/014,062 application for patent.

The document management apparatus 102 may incorporate the secure key-map files 140a-144$m_X$ into the PPCD 130, such that, the secure key-map files 140a-144$m_X$ may simultaneously be provided to the participants 110a-110p within the PPCD 130. Alternatively, however, the secure key-map files 140a-144$m_X$ may be stored on a separate medium and distributed to the participants 110a-110p.

According to an example, each of the secure key-map files 140a-144$m_X$ is signed by the document master signature key, and each participant 110a-110p has the corresponding document master's signature verification key. The authenticity of the secure key-map files 140a-144$m_X$ within the received PPCD 130 may therefore be automatically verified by the recipient participant 110a-110p upon receiving the PPCD 130 through use of the document master's signature verification key to authenticate the signatures of the secure key-map files 140a-144$m_X$.

Figure 2:
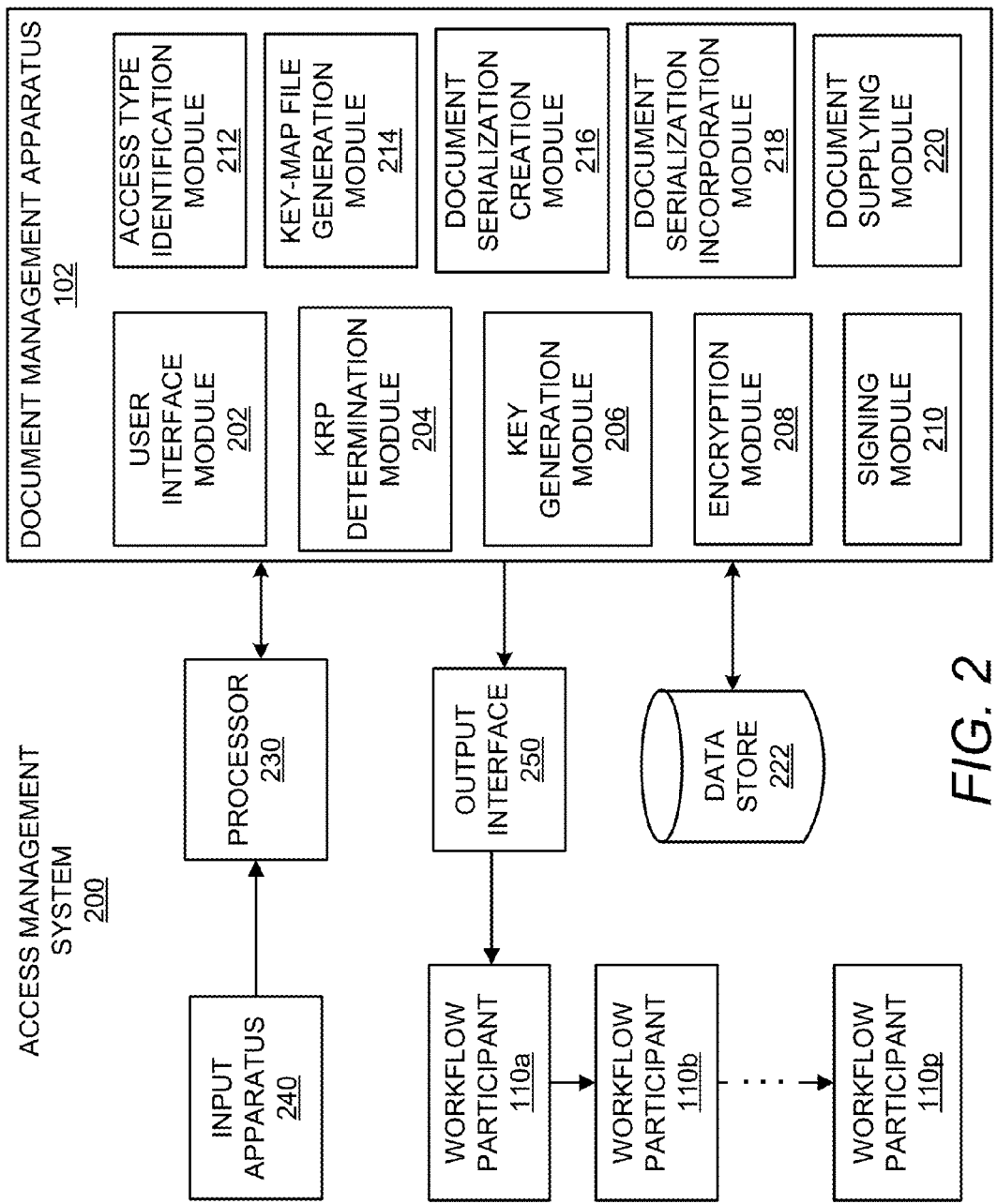
FIG. 2 shows a simplified block diagram of an access management system containing the document management apparatus depicted in FIG. 1, according to an example of the present disclosure.

With particular reference now to FIG. 2, there is shown a simplified block diagram of an access management system 200 containing the document management apparatus 102 depicted in FIG. 1, according to an example. It should be apparent that the block diagram depicted in FIG. 2 represents a generalized illustration and that other components may be added or existing components may be removed, modified or rearranged without departing from a scope of the access management system 200.

As shown in FIG. 2, the document management apparatus 102 includes a user interface module 202, a key reset point (KRP) determination module 204, a key generation module 206, an encryption module 208, a signing module 210, an access type identification module 212, a key-map file generation module 214, a document serialization creation module 216, a document serialization incorporation module 218, and a document supplying module 220. The modules 202-220 may comprise software modules, hardware modules, or a combination of software and hardware modules. Thus, in one example, at least one of the modules 202-220 comprises a circuit component. In another example, at least one of the modules 202-220 comprises machine-readable code stored on a computer readable storage medium, which is executable by a processor.

In any regard, the document management apparatus 102 is to be implemented and/or executed by a processor 230. Thus, for instance, the document management apparatus 102 may comprise an integrated and/or add-on hardware device of a computing device comprising the processor 230. As another example, the document management apparatus 102 may comprise a computer readable storage device upon which machine-readable instructions for each of the modules 202-220 is stored and executed by the processor 230.

As further shown in FIG. 2, the processor 230 is to receive input from an input apparatus 240. The input apparatus 240 may comprise, for instance, a user interface through which a user may supply keys, such as, public keys, for use in encrypting/signing the key-map files 140a-144$m_X$. The input apparatus 240 may also comprise a user interface through which a user may define the access rights that the participants 110a-110p are to have to the secure content-part 132a at different content access sessions.

The various keys supplied by the participants 110a-110p as well as the access levels may be stored in a data store 222, which may comprise volatile and/or non-volatile memory, such as DRAM, EEPROM, MRAM, phase change RAM (PCRAM), Memristor, flash memory, and the like. In addition, or alternatively, the data store 222 may comprise a device to read from and write to a removable media, such as, a floppy disk, a CD-ROM, a DVD-ROM, or other optical or magnetic media.

The access management system 200 also includes an output interface 250 through which keys and the secure content-parts 132a-132n may be supplied to the participants 110a-110p. The keys and the PPCD 130 may be supplied to the participants 110a-110p in any of the manners discussed in U.S. patent application Ser. No. 12/949,510.

Figure 3:
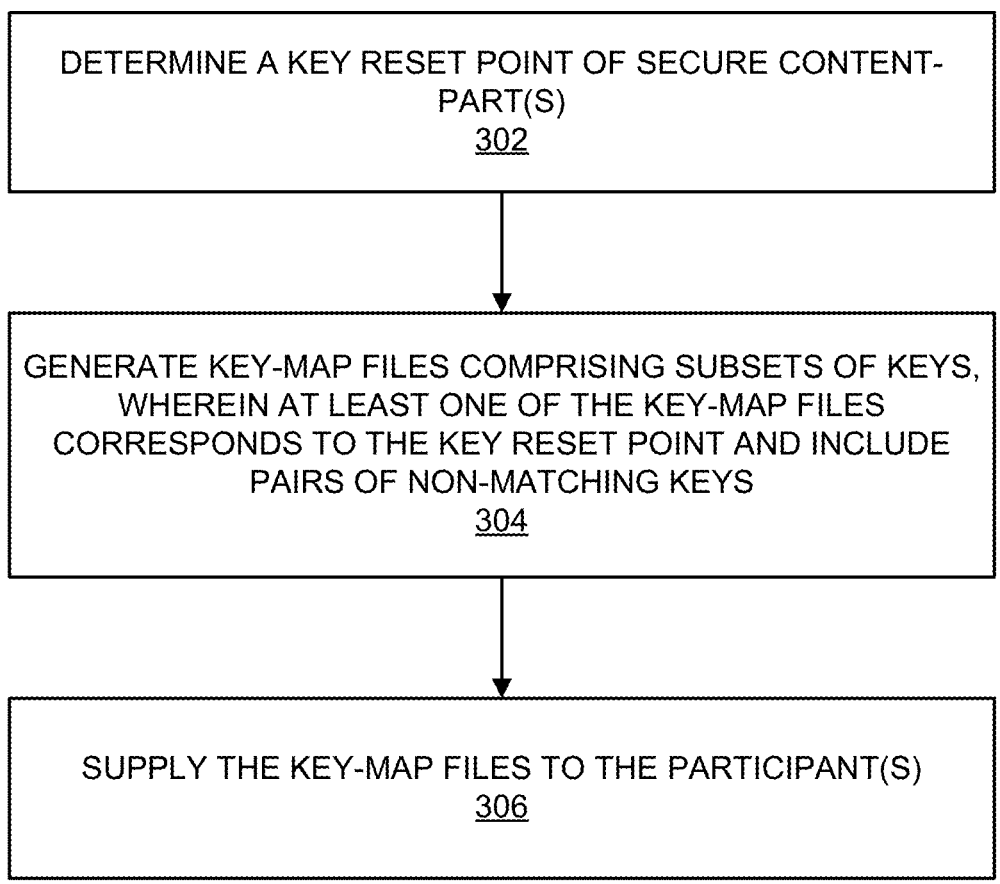
FIGS. 3 and 4, respectively, show flow diagrams of methods for providing managing access to secure content-parts of a PPCD by a plurality of participants, according to examples of the present disclosure.
Figure 4:
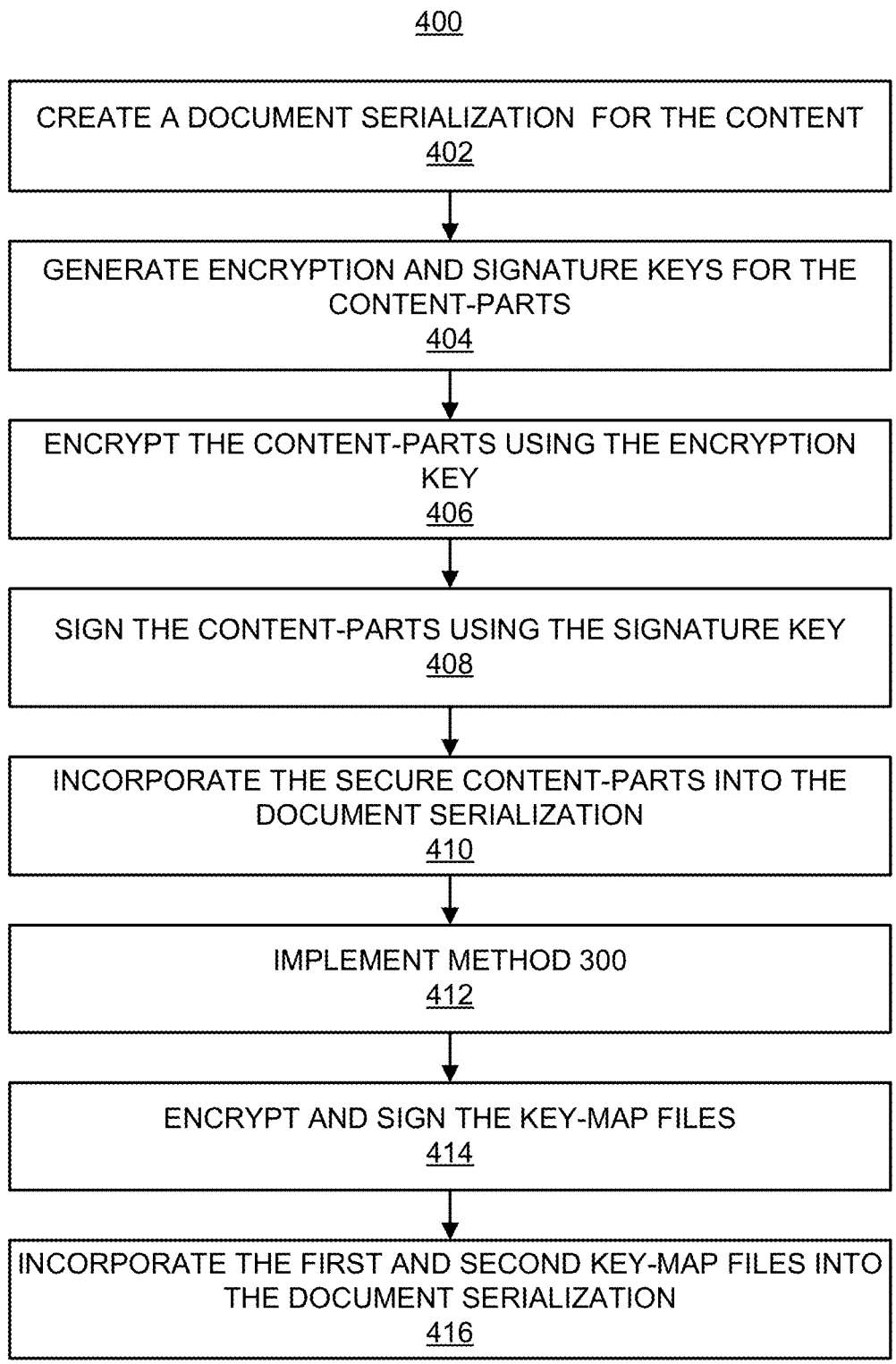

Various manners in which the processor 230 may implement the modules 202-220 are described in greater detail with respect to FIGS. 3 and 4, which, respectively depict flow diagrams of methods 300 and 400 for managing access to a secure content-part 132a of a PPCD 130 by a plurality of participants 110a-110p, according to an example. It should be apparent that the methods 300 and 400 represent generalized illustrations and that other operations may be added or existing operations may be removed, modified or rearranged without departing from the scopes of the methods 300 and 400.

The descriptions of the methods 300 and 400 are made with particular reference to the document management apparatus 102 depicted in FIGS. 1 and 2. It should, however, be understood that the methods 300 and 400 may be implemented in an apparatus that differs from the document management apparatus 102 without departing from the scopes of the methods 300 and 400. In addition, the document management apparatus 102 may implement the methods 300 and 400 while the secure content-part 132a is within a secure environment and prior to the secure content-part 132a being released outside of the secure environment.

In the following descriptions of the methods 300 and 400, the "first participant 110a" is not intended to necessarily denote the first participant to receive the PPCD 130 in a workflow. Instead, the "first participant 110a" is to distinguish that participant from other participants in the workflow. In this regard, the "first participant 110a" may denote any of the participants 110a-110p in a workflow and the "second participant 110b" may denote another one of the participants 110a-110p that is to receive the PPCD 130 at a later time from the first participant. In addition, although particular reference is made to a single secure content-part 132a, the description below should be understood to relate to the remaining secure content-parts 132b-132n. Thus, for instance, it should be understood that various ones of the secure content-parts 132a-132n may be encrypted and signed using different sets of keys and may thus require different sets of decryption and verification keys to enable the various ones of the secure content-parts 132a-132n to be accessed. In this regard, the participants 110a-110p may be granted different levels of access to different ones of the secure content-parts 132a-132n during different content access sessions based upon the particular keys contained in the respective key-map files 140a-144m.

With reference first to the method 300, at block 302, a key reset point of the secure content-part 132a during a workflow among a plurality of participants 110a-110p is determined, for instance, by the KRP determination module 204. More particularly, the KRP determination module 204 may determine that the keys required to access the secure content-part 132a are to be reset at some point during the workflow, which is described herein as the key reset point. The KRP determination module 204 may make this determination through receipt, for instance, of an instruction from a user, through access to information pertaining to the key reset point stored on the data store 222, etc. According to an example, the KRP determination module 204 analyzes the workflow for situations in which at least one participant 110p requires at least two access sessions (session i and session j, i<j) with different access rights to the same secure content-part 132a, in which another participant 110a is to access the secure content-part 132a during that participant's 110a session (session k), which is between those two sessions of the first participant 110p (i≤k<j), and the another participant 110a is granted Read-Write access to the secure content-part 132a at session k. In addition, the participant 110p may also act as a KRP at session i if the participant is given Read-Write access to the secure content-part 132a.

Figure 5:
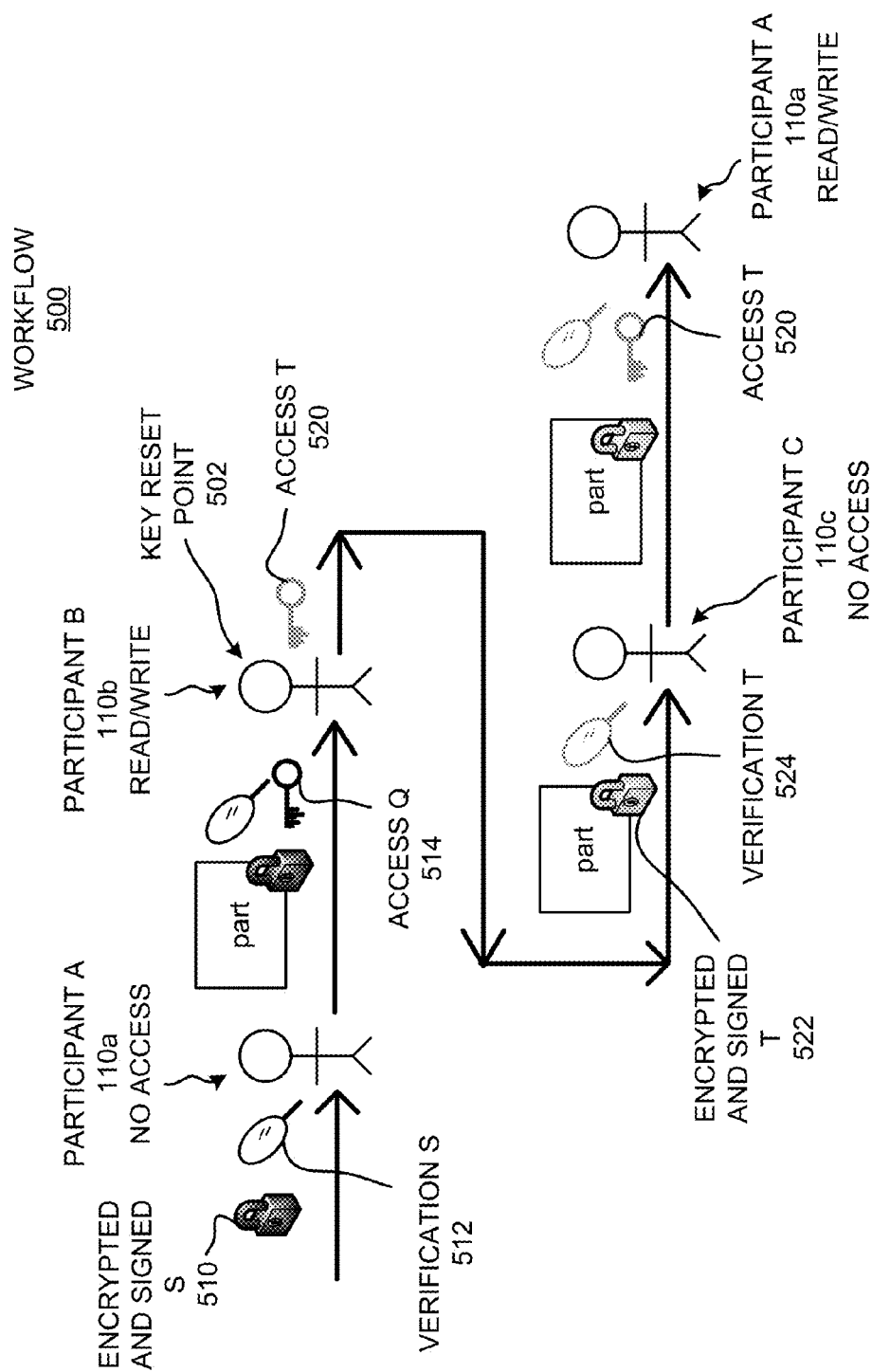
FIG. 5 shows a diagram of a workflow including a key reset point, according to an example of the present disclosure.

Although particular reference is made herein to an example in which the access keys for a single secure content-part 132a are reset, it should be clearly understood that the access keys for any number of secure content-parts 132a-132n may be reset at any (and in certain examples, at multiple) workflow step(s) for which a participant 110a-110p has been granted Read-Write access and the reset is required. By way of example, reference is made to FIG. 5, which depicts a diagram of a workflow 500 including a key reset point 502. As shown in FIG. 5, a second participant 110b is to function as a key reset point for the secure content-part 132a during a particular content access session of the workflow. In this regard, the second participant 110b is to have read/write access to the secure content-part 132a. In addition, a first participant 110a is to have no access to the secure content-part 132a prior to the key reset point 502 and is to be granted Read-Write access after the KRP 502, the third participant 110c is to have no access to the secure content-part 132a.

The first participant 110a is therefore to be provided with a first access (S) verification key 512 to verify the signature of the secure content-part 132a that has been encrypted and signed using a first signature key and a first encryption access (S) key 510. However, the first participant 110a is not to be provided with a first decryption key and thus, cannot decrypt the secure content-part 132a. The second participant 110b, who is provided read/write access, is to be provided with first access (S) keys 514 that include the first verification key and the first decryption key and thus, the second participant 110b is able to verify and decrypt the secure content-part 132a. In addition, because the second participant 110b is assigned to be a key reset point 502, the second participant 110b is to be provided with second access keys (T) 520 that include a second signature key and a second encryption key. The second participant 110b will therefore be able to re-encrypt the secure content-part 132a using the second encryption key and to re-sign the secure content-part 132a using the second signature key.

The third participant 110c, who is provided no access to the secure content-part 132a is to be provided with a second (T) verification key 524 to verify the signature of the secure content-part 132a that has been encrypted and signed using a second signature key and a second encryption key 520. However, the third participant 110c is not to be provided with a first or second decryption key and thus, cannot decrypt the secure content-part 132a, either before or after the key reset point 502.

The first participant 110a is also to be provided with a second (T) decryption key and a second verification key 520 to thereby enable the first participant 110d to be able to verify the signature of and decrypt the secure content-part 132a following the key reset point 502.

With reference back to FIG. 3, at block 304, a plurality of key-map files $R_{ij}$ 140a-144$m_X$ comprising subsets of access keys that provide access to the secure content-part 132a are generated, in which, at least one of the plurality of key-map files $R_{ij}$ 140a-144$m_X$ corresponds to the key reset point and comprises a first decryption key, a first verification key, a second encryption key, and a second signature key, wherein the first decryption key does not correspond to the second encryption key, and wherein the first verification key does not correspond to the second signature key, for instance, by the key map-file generation module 214. More particularly, the access keys contained in the at least one of the plurality of key-map files $R_{ij}$ 140a-144$m_X$ that correspond to the key reset point are to be implemented to verify a signature of the secure content-part 132a using the first verification key, to decrypt the secure content-part 132a using the first decryption key, to re-encrypt the decrypted secure content-part 132a using the second encryption key, and to re-sign the encrypted secure-content part 132a using the second signature key.

At block 306, the key-map files $R_{ij}$ 140a-144$m_X$ are distributed to at least one of the participants 110a-110p, for instance, by the document supplying module 220. According to an example, the key-map files $R_{ij}$ 140a-144$m_X$ are incorporated into the PPCD 130 and the PPCD 130 is supplied to a participant 110a.

According to an example, at block 302, a determination as to which of the key-map files $R_{ij}$ 140a-144$m_X$ corresponds to access to a version of the secure content-part 132a prior to the key reset point is made, for instance, by the access type identification module 212. In addition, the key-map files $R_{ij}$ 140a-144$m_X$ corresponding to the version of the secure content-part 132a prior to the key reset point are generated to comprise at least one of the first decryption key and the first verification key, which do not enable access to the version of the secure content-part 132a following the key reset point. As such, for instance, with reference to FIG. 5, the key map-file 140a for the first participant 110a is generated to include the first verification key.

According to another example, at block 302, a determination as to which of the key-map files $R_{ij}$ 140a-144$m_X$ corresponds to access to a version of the secure content-part 132a following the key reset point is made, for instance, by the access type identification module 212. In addition, the key-map files $R_{ij}$ 140a-144$m_X$ corresponding to the version of the secure content-part 132a following the key reset point are generated to comprise at least one of the second decryption key and the second verification key, which do not enable access to the version of the secure content-part 132a prior to the key reset point. As such, for instance, with reference to FIG. 5, the key map-file 144a for the third participant 110c is generated to include the second verification key.

According to a further example, at block 302, a determination that a participant 110p is to have a first access to a version of the secure content-part 132a prior to the key reset point for that secure content-part and to have a second access to this secure content-part 132a following the key reset point is made, for instance, by the access type identification module 212. Thus, for instance, a determination similar to that shown in FIG. 5 for the first participant 110a may be made. In addition, the key-map files $R_{ij}$ 140a-144$m_X$ corresponding to the versions of the secure content-part 132a prior to and following the key reset point are generated. As such, for instance, with reference to FIG. 5, the key map-files 140a, 140b for the first participant 110a may comprise respective keys that enable access to the versions of the secure content-part 132a at each of the respective content access sessions, without enabling access to the other versions of the secure content-part 132a.

Turning now to FIG. 4, which includes the method 300 as part of the method 400, at block 402, a document serialization for the PPCD 130 to be accessed by a plurality of participants 110a-110p is created, for instance, by the document serialization creation module 216. By way of example, the document serialization creation module 216 may create the document serialization for the PPCD 130 by creating a new SQLite database, ZIP archive, or the like.

At block 404, various encryption and signature keys for the secure content-part 132a are generated or derived, for instance, by the key generation module 206. The key generation module 206 may generate/derive keys to be employed in encrypting and signing the secure content-part 132a. Alternatively to generating or deriving the various keys, the key generation module 206 may instead retrieve the various keys from another storage location, such as the data store 222. In any regard, the key generation module 206 may also determine which keys are associated with the secure content-part 132a.

The key generation module 206 may generate, for each secure content-part 132a-132n that along the entire workflow has N key reset points, N+1 encryption/decryption pairs and N+1 signature/verification pairs. According to an example, for each secure content-part 132a-132n for which a key reset point is assigned, the key generation module 206 assigns 2 pairs of encryption/decryption keys and 2 pairs of signature/verification keys.

As such, in instances where a secure content-part 132a has at least one KRP assigned, a corresponding number of keys is assigned to the secure content-part. At block 406, each content-part 122a-122n is encrypted using the first encryption key assigned to the content-part, for instance, by the encryption module 208 and then signed by the first signature key from signature keys assigned to the content-part, for instance, by the signing module 210, as indicated at block 408. The encryption of the content-parts 122a-122n may use any standard or proprietary encryption mechanism, such as, for instance, symmetric AES encryption, Twofish encryption, asymmetric RSA, etc. The secure content-parts 132a-132n may be signed, for example, through use of a Digital Signature Algorithm, RSA based signatures, etc. In addition, each or various groups of the secure content-parts 132a-132n may be encrypted and signed using different encryption and signature keys.

At block 410, the secure content-part 132a is incorporated into the document serialization, for instance, by the document serialization incorporation module 218.

At block 412, the method 300 is implemented to generate the key map-files $R_{ij}$ 140a-144$m_X$ that include at least one key map-file containing keys for resetting keys at a particular workflow part as discussed above.

According to an example, the participants 110a-110p may be granted one of a "no access" type, a "read only access" type, and a "modify access" type to the secure content-part 132a. In addition, the first participant 110a may be granted a different type of access to the secure content-part 132a than a second participant 110b. Further, the first participant 110a may be granted several different types of access to the different versions of the secure content-part 132a at several different content access sessions during the workflow, for instance, before and after a key reset point. Various aspects of the different types of access that the participants 110a-110p may be granted to the secure content-part 132a are described in greater detail in the Ser. No. 12/949,510 application for patent. As such, the description of the different access types provided in that application for patent is relied upon herein.

Figure 6:
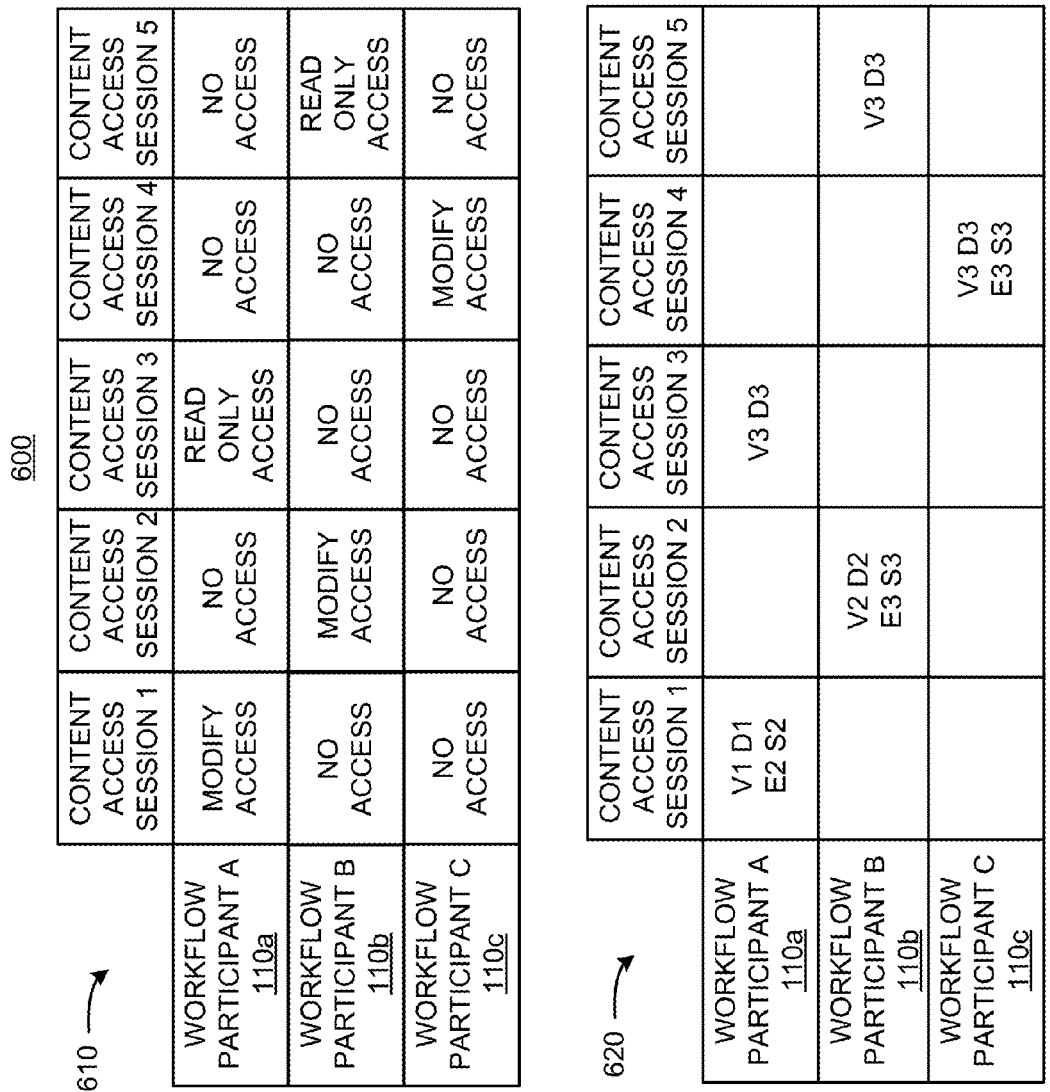
FIG. 6 shows a diagram of a manner in which key-map files may be generated to include appropriate subsets of keys to enable the participants to have predetermined types of access to secure content-parts at various content access sessions, according to an example of the present disclosure.

Additional details on how the key-map file generation module 214 may generate the key-map files $R_{ij}$ 140a-144$m_X$ to include the appropriate subsets of keys to enable the participants 110a-110p to have predetermined types of access to the secure content-part 132a at various workflow steps are described in greater detail with respect to FIG. 6, according to an example of the present disclosure. It should be understood that the diagram 600 is a generalized illustration and that other elements may be included therein without departing from a scope of the diagram 600. Thus, for instance, although three participants 110a-110c have been depicted in the diagram 600, it should be understood that various aspects disclosed therein may be applied to any number of participants 110d-110p without departing from a scope of the diagram 600.

The diagram 600 includes two charts 610 and 620. Both of the charts 610 and 620 depict a simple case of three participants 110a-110c and five content access sessions for the same secure content-part 132a. The first chart 610 depicts an example of the access types that each of the participants 110a-110c is to be provided to the secure content-part 132a at each of the five content access sessions. In this regard, respective access types during each of the content access sessions may be determined for the secure content-part 132a. It should be understood that the principles discussed herein with respect to the secure content-part 132a may be applied to the remaining secure content-parts 132b-132n.

As shown in the first chart 610, during the first content access session, the first participant 110a is to have a modify (Read-Write) access type, while the second participant 110b and the third participant 110c do not have access to the secure content-part 132a. Following access and modification to the secure content-part 132a, the first participant 110a may have supplied the modified secure content-part 132a to the second participant 110b. During the second content access session, the second participant 110b is to have a modify access type to the secure content-part 132a, while the first and the third participants 110a, 110c are to have a no access type. Following access and modification to the modified secure content-part 132a, the second participant 110b may have supplied the modified secure content-part 132a back to the first participant 110a. During the third content access session, the first participant 110a is to have a read only access type to the secure content-part 132a, while the second and third participants 110b, 110c have a no access type. Following access to the modified secure content-part 132a, the first participant 110a may have supplied the modified secure content-part 132a to the third participant 110c. During the fourth content access session, the third participant 110c is to have a modify access type to the secure content-part 132a, while the first and second participants 110a, 110b have a no access type. Following access and modification to the modified secure content-part 132a, the third participant 110c may have supplied the modified secure content-part 132a to the first and second participants 110a, 110b. During the fifth content access session, the first participant 110a is to have a modify access type, the second participant 110b is to have a read only access type, and the third participant 110c is to have a no access type.

Turning now to the chart 620, there are shown the corresponding subsets of keys that are to be included in the key-map files 140a-144m for the participants 110a-110c for each of the content access sessions. As shown therein, for the first content access session, the first participant 110a is to be supplied with a first verification key (V1), a first decryption key (D1), a second encryption key (E2), and a second signature key (S2). In this regard, the first participant 110a may verify the signature key used by the document management apparatus 102 to sign the secure content-part 132a using the first verification key (V1). In addition, the first participant 110a may decrypt the secure content-part 132a using the first decryption key (D1), which may correspond to the encryption key used by the document management apparatus 102 to encrypt the secure content-part 132a. The first participant 110a may also modify the secure content-part 132a, encrypt the modified secure content-part 132a using the second encryption key (E2), and may sign the modified secure content-part 132a using the second signature key (S2). In this regard, the first participant 110a will reset the access for the secure content-part 132a. The secure content-part 132a is now encrypted and signed by new keys E2 and S2. Thus, if any subsequent participant accidentally or intentionally obtains a copy of the original version of PPCD 130 containing the secure-content part 132a, they will be unable to gain access to this secure content-part 132a, unless they have been provided with the appropriate keys (E2, S2).

In addition, for the first access session, the key-map file generation module 212 may have created key-map files for the second and third participants 110b, 110c that only include the first verification key (K1) for the secure content-part 132a.

For the second content access session (workflow step), the key-map file generation module 212 may generate (when the PPCD 130 was created) a key-map file 142a for the second participant 110b that includes a second verification key (V2), a second decryption key (D2), a third encryption key (E3), and a third signature key (S3) for the secure content-part 132a. In this regard, the second participant 110b may use the second verification key (V2) to verify the second signature key (S2) used by the first participant 110a to sign the secure content-part 132a. In addition, the second participant 110b may use the second decryption key (V2) to decrypt the secure content-part 132a that has been encrypted using the second encryption key (E2) by the first participant 110a during the first content access session (workflow step). The second participant 110b may also modify the secure content-part 132a, encrypt the modified secure content-part 132a using the third encryption key (E3), and may sign the modified secure content-part 132a using the third signature key (S3). As such, during the second content access session (workflow step), the second workflow participant 110b will reset access to this secure content-part 132a again.

For the third content access session (workflow step), the key-map file generation module 212 may generate a key-map file 140b for the first participant 110a that includes a third verification key (V3) and a third decryption key (D3). In this regard, the first participant 110a is to use the third verification key (V3) to verify the third signature key (S3) used by the second participant 110b to sign the secure content-part 132a. In addition, the first participant 110a is to use the third decryption key (V3) to decrypt the secure content-part 132a that has been encrypted using the third encryption key (E3) by the second participant 110b during the second content access session.

For the fourth content access session, the key-map file generation module 212 may generate a key-map file 144a for the third participant 110c that includes the third verification key (V3), the third decryption key (D3), the third encryption key (E3), and the third signature key (S3). In this regard, the third participant 110c may use the third verification key (V3) to verify the third signature key (S3) used by the second participant 110b to sign the secure content-part 132a during the second content access session. In addition, the third participant 110c may use the third decryption key (V3) to decrypt the secure content-part 132a. The third participant 110c may also modify the secure content-part 132a, encrypt the modified secure content-part 132a using the third encryption key (E3), and may sign the modified secure content-part 132a using the third signature key (S3). In this regard, although the third workflow participant 110c has been granted Read-Write access to the secure content-part 132a at the fourth content access session (workflow step), the third workflow participant 110c is not a key reset point at the fourth content access session (workflow step) because the third participant 110c has not been provided a different pair of encryption/signature keys at the fourth content access session (workflow step).

For the fifth content access session, the key-map file generation module 212 may generate a second key-map file 142b for the second participant 110b that includes the third verification key (V3) and the third decryption key (D3). In this regard, the first participant 110a may use the third verification key (V3) to verify the third signature key (S3) used to sign the secure content-part 132a. Moreover, the second participant 110b is to use the third decryption key (V3) to decrypt the secure content-part 132a, which has been encrypted using the third encryption key (E3).

As may be seen from the charts 610 and 620, the second participant 110b has not been granted the appropriate access keys (V1 and D1) to be able to access the version of the secure content-part 132a prior to the resetting of the keys by the first participant 110a. Instead, the second participant 110b may access the version of the secure content-part 132a in the second content access session after the first participant 110a has decrypted and verified the secure content-part 132a using the access keys V1 and D1 and encrypted and signed the secure content-part 132a using the access E2 and S2. In this regard, access to the various versions of the secure content-part 132a may be managed without requiring that the secure content-part 132a be returned to the document management apparatus 102.

With reference back to FIG. 4, at block 414, the key-map files $140\text{-}144m_x$, are encrypted and signed, for instance, by the encryption module 208 and the signing module 210. According to an example, the encryption module 208 encrypts the key-map files $140\text{-}144m_x$ using respective symmetric keys. The symmetric keys generally comprise single secret keys that are used for both encryption and decryption. In contrast, public-private key pairs are asymmetric keys because different keys are used for encryption and decryption. In any regard, the encryption module 206 may encrypt one of the key-map files $140\text{-}144m_x$ and the symmetric keys used to encrypt the key-map files $140a\text{-}144n$ using respective public keys of the participants 110a-110p. According to an example, the encryption of the key-map files $140\text{-}144m_x$/symmetric keys is performed while the key-map files $140\text{-}144m_x$ are contained in the PPCD 130. In another example, the key-map files $140\text{-}144m_x$ may be extracted from the PPCD 130 prior to the encryption and inserted back into the PPCD 130 following encryption, for instance, by the document serialization incorporation module 218. In any regard, the signing module 210 may sign the key-map files $140\text{-}144m_x$, using at least one signature key.

At block 416, the secure key-map files $140\text{-}144m_x$ may be incorporated into the document serialization created at block 402. In addition, although not shown, the document serialization of the PPCD 130 may be communicated to at least the first participant 110a in the workflow order, who may be outside of the secure environment in which the document management apparatus 102 is located.

The document management apparatus 102 may implement the method 300 and/or the method 400 to thereby manage access to the secure content-parts 132a-132n of a PPCD 130 by participants 110a-110p of a workflow. That is, the document management apparatus 102 may manage access to the secure content-parts 132a-132n by the participants 110a-110n without having to receive the PPCD 130 back from the participants 110a-110p. The method 300 also enables the participants 110a-110p to be able to access versions of the secure content-part(s) 132a-132n at certain points in the workflow while being unable to access different versions of the secure content-part(s) 132a-132n at other points in the workflow. As such, the document management apparatus 102 may implement the method 300/400 to grant access to a version of the secure content-part(s) 132a-132n to a participant 110n without granting access to other versions of the secure content-part(s) 132a-132n to the participant 110p.

Some or all of the operations set forth in the figures may be contained as a utility, program, or subprogram, in any desired computer readable storage medium. In addition, the operations may be embodied by machine-readable instructions. For example, they may exist as machine-readable instructions in source code, object code, executable code or other formats. Any of the above may be embodied on a computer readable storage medium, which include storage devices.

Examples of non-transitory computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 7:
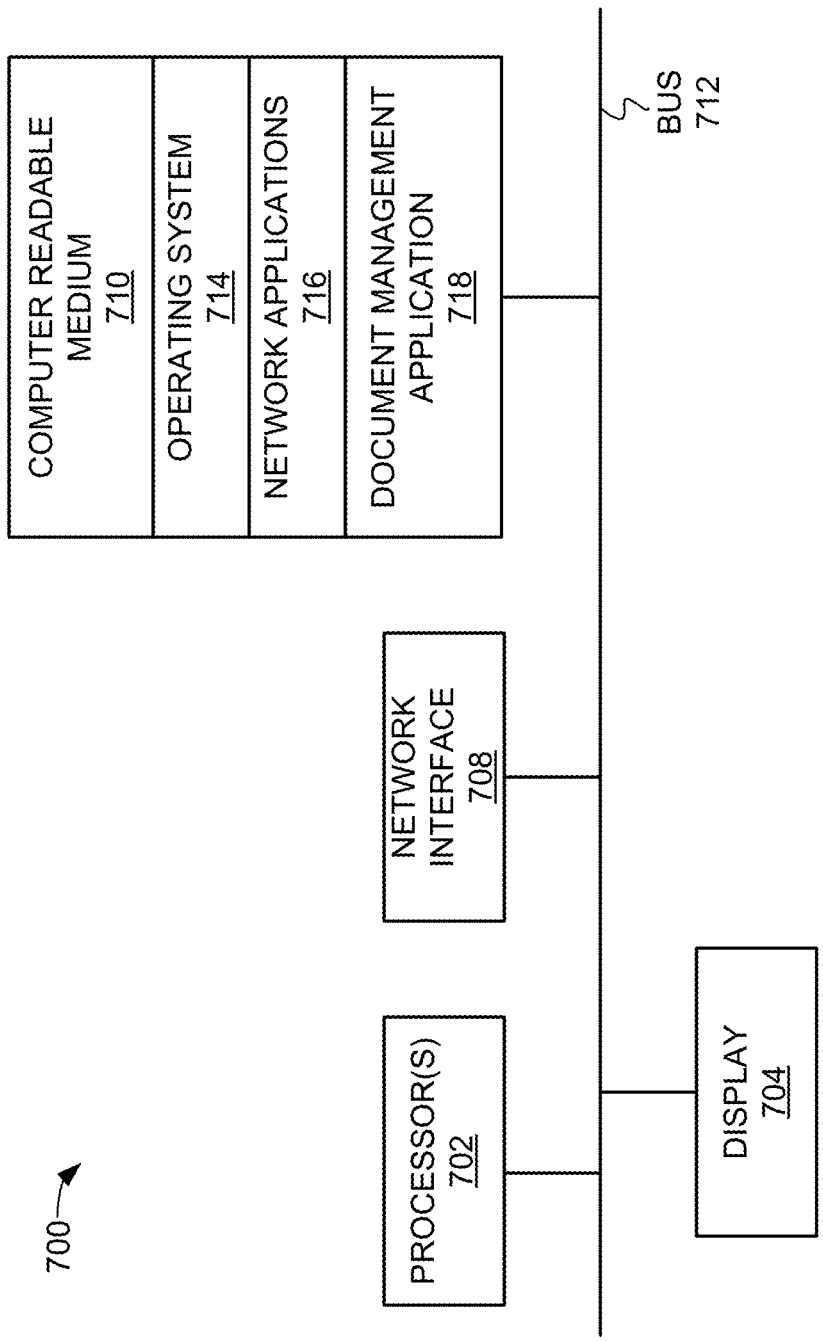
FIG. 7 shows a block diagram of a computer system that may be used as a platform for implementing or executing one or more of the processes depicted in FIGS. 3 and 4, according to an example of the present disclosure.

Turning now to FIG. 7, there is shown a schematic representation of a computing device 700 that may be used as a platform for implementing or executing at least one of the processes depicted in FIGS. 3 and 4, according an example. The device 700 includes a processor 702, such as a central processing unit; a display 704, such as a monitor; a network interface 708, such as a Local Area Network LAN, a wireless 802.11x LAN, a 3G mobile WAN or a WiMax WAN; and a computer-readable medium 710. Each of these components is operatively coupled to a bus 712. For example, the bus 712 may be an EISA, a PCI, a USB, a FireWire, a NuBus, or a PDS.

The computer readable medium 710 may be any suitable non-transitory medium that participates in providing instructions to the processor 702 for execution. For example, the computer readable medium 710 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 710 may also store other machine-readable instructions, including word processors, browsers, email, Instant Messaging, media players, and telephony machine readable instructions.

The computer-readable medium 710 may also store an operating system 714, such as Mac OS, MS Windows, Unix, or Linux; network applications 716; and a secure content management application 718. The operating system 714 may be multi-user, multiprocessing, multitasking, multithreading, real-time and the like. The operating system 714 may also perform basic tasks, such as recognizing input from input devices, such as a keyboard or a keypad; sending output to the display 704; keeping track of files and directories on medium 710; controlling peripheral devices, such as disk drives, printers, image capture device; and managing traffic on the bus 712. The network applications 716 include various components for establishing and maintaining network connections, such as machine readable instructions for implementing communication protocols including TCP/IP, HTTP, Ethernet, USB, and FireWire.

The secure content management application 718 provides various machine readable instructions for managing access to a secure content-part of a PPCD by a plurality of participants 110a-110p, as described above with respect to FIGS. 3 and 4. Thus, for instance, the document management application 718 may include machine-readable instructions to determine a key reset point of the secure content-part during a workflow among the workflow participants. The secure content management application 718 may also include machine-readable instructions to generate a plurality of key-map files comprising subsets of access keys that provide access to the secure content-part during respective content access sessions, in which at least one of the plurality of key-map files corresponds to the key reset point and comprises a first decryption key, a first verification key, a second encryption key, and a second signature key, wherein the first decryption key does not correspond to the second encryption key, in which the first verification key does not correspond to the second signature key, in which the access keys contained in the at least one of the plurality of key-map files that corresponds to the key reset point are to be implemented to verify a signature of the secure content-part using the first verification key, to decrypt the secure content-part using the first decryption key, to re-encrypt the decrypted secure content-parts using the second encryption key, to sign the encrypted secure-content part using the second signature key, and to supply the plurality of key-map files to at least one of the participants. In certain examples, some or all of the processes performed by the application 718 may be integrated into the operating system 714. In certain examples, the processes may be at least partially implemented in digital electronic circuitry, or in computer hardware, machine-readable instructions (such as, firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, in which the present disclosure is intended to be defined by the following claims—and their equivalents—in which all terms are mean in their broadest reasonable sense unless otherwise indicated.

What is claimed is:

1. A method for managing access to a secure content-part of a publicly posted composite document (PPCD) by workflow participants, said method comprising:
    determining a key reset point of the secure content-part during a workflow among the workflow participants; and
    generating, by the processor, in a secure environment, a plurality of key-map files comprising subsets of access keys that provide access to the secure content-part during respective content access sessions, wherein at least one of the plurality of key-map files corresponds to the key reset point and comprises a first decryption key, a first verification key, a second encryption key, and a second signature key,
    wherein the first decryption key does not correspond to the second encryption key, wherein the first verification key does not correspond to the second signature key, and
    wherein the access keys contained in the at least one of the plurality of key-map files that corresponds to the key reset point are to be implemented to verify a signature of the secure content-part using the first verification key, to decrypt the secure content-part using the first decryption key, to re-encrypt the decrypted secure content-part using the second encryption key, and to sign the encrypted secure-content part using the second signature key;
    encrypting the plurality of key-map files using respective symmetric keys;
    encrypting the symmetric keys using respective public keys of the workflow participants; and
    supplying the PPCD and the plurality of key-map files to at least one of the workflow participants outside of the secure environment without the at least one of the workflow participants being granted access to the secure environment.

2. The method according to claim 1, further comprising:
    determining which of the plurality of key-map files corresponds to access to a version of the secure content-part prior to the key reset point; and
    wherein generating the plurality of key-map files further comprises generating the key-map file that corresponds to the version of the secure content-part prior to the key reset point to comprise at least one of the encryption key corresponding to the first decryption key and the signature key corresponding to the first verification key.

3. The method according to claim 1, further comprising:
    determining which of the plurality of key-map files correspond to access to a version of the secure content-part following the key reset point; and
    wherein generating the plurality of key-map files further comprises generating at least one of the plurality of key-map files that corresponds to the secure content-part following the key reset point to comprise at least one of a second decryption key and a second verification key, wherein the second decryption key corresponds to the second encryption key and the second verification key corresponds to the second signature key.

4. The method according to claim 1, further comprising:
    determining that a participant is to have a first access to a version of the secure content-part prior to the key reset point and that the participant is to have a second access to a version of the secure content-part following the key reset point; and
    wherein generating the plurality of key-map files further comprises generating a first key-map file for the participant that includes a first set of keys that enables the participant to have the first type of access to the version of the secure content-part prior to the key reset point, wherein the first set of keys are unable to provide the second type of access to the version of the secure content-part following the key reset point.

5. The method according to claim 4, wherein generating the plurality of key-map files further comprises generating a second key-map file for the participant that includes a second set of keys that enables the participant to have the second type of access to the version of the secure content-part following the key reset point, wherein the second set of keys are unable to provide the first type of access to the version of the secure content-part prior to the key reset point.

6. The method according to claim 1, further comprising:
    determining that a participant is to have a first type of access to a version of the secure content-part prior to the key reset point and that the participant is to have no access to a version of the secure content-part following the key reset point; and
    wherein generating the plurality of key-map files further comprises generating a key-map file for the participant that includes a first set of keys that enable the participant to have the first type of access to the version of the secure content-part prior to the key reset point, wherein the first set of keys are unable to provide any access to the version of the secure content-part following the key reset point.

7. The method according to claim 1, further comprising:
    determining that a participant is to have no access to a version of the secure content-part prior to the key reset point and that the participant is to have a second type of access to a version of the secure content-part following the key reset point; and
    wherein generating the plurality of key-map files further comprises generating a first key-map file for the participant that includes a first set of keys that enables the participant to have the second type of access to the version of the secure content-part following the key reset point, wherein the first set of keys are unable to provide any access to the version of the secure content-part prior to the key reset point.

8. The method according to claim 1, further comprising:
encrypting the secure content-part using a first encryption key, wherein the first decryption key corresponds to the first encryption key;
signing the secure content-part using a first signature key, wherein the first verification key corresponds to the first signature key; and
incorporating the secure content-part into a document serialization of the PPCD.

9. The method according to claim 1, further comprising:
incorporating the encrypted plurality of key-map files into the PPCD.

10. An apparatus for managing access to a secure content-part of a publicly posted composite document (PPCD) by workflow participants, said apparatus comprising:
a processor; and
a hardware memory on which is stored machine readable instructions that cause the processor to:
determine a key reset point of the secure-content part during a workflow among the workflow participants to be a key reset point;
generate, in a secure environment, a plurality of key-map files comprising subsets of access keys that provide access to the secure content-part during respective content access sessions, wherein at least one of the plurality of key-map files corresponds to the key reset point, and wherein the at least one of the plurality of key-map files comprises a first decryption key, a first verification key, a second encryption key, and a second signature key, wherein the first decryption key does not correspond to the second encryption key, and wherein the first verification key does not correspond to the second signature key;
encrypt the plurality of key-map files using respective symmetric keys;
encrypt the symmetric keys using respective public keys of the workflow participants;
incorporate the encrypted plurality of key-map files into the PPCD; and
supply the PPCD and the plurality of key-map files to at least one of the workflow participants outside of the secure environment without the at least one of the workflow participants being granted access to the secure environment.

11. The apparatus according to claim 10, wherein the machine readable instructions are further to cause the processor to determine which of the plurality of key-map files correspond to access to a version of the secure content-part following the key reset point and to generate at least one of the plurality of key-map files that corresponds to the secure content-part following the key reset point to comprise at least one of a second decryption key and a second verification key, wherein the second decryption key corresponds to the second encryption key and the second verification key corresponds to the second signature key.

12. The apparatus according to claim 10, wherein the machine readable instructions are further to cause the processor to determine that a participant is to have a first type of access to a version of the secure content-part prior to the key reset point and that the participant is to have a second type of access to a version of the secure content-part following the key reset point and to generate a first key-map file for the participant that includes a first set of keys that enables the participant to have the first type of access to the version of the secure content-part prior to the key reset point, wherein the first set of keys are unable to provide the second type of access to the version of the secure content-part following the key reset point.

13. The apparatus according to claim 10, wherein the machine readable instructions are further to cause the processor to determine that a participant is to have a first type of access to a version of the secure content-part prior to the key reset point and that the participant is to have no access to a version of the secure content-part following the key reset point and to generate a key-map file for the participant that includes a first set of keys that enables the participant to have the first type of access to the version of the secure content-part prior to the key reset point, wherein the first set of keys are unable to provide any access to the version of the secure content-part following the key reset point.

14. The apparatus according to claim 10, wherein the machine readable instructions are further to cause the processor to determine that a participant is to have no access to a version of the secure content-part prior to the key reset point and that the participant is to have a second type of access to a version of the secure content-part following the key reset point and to generate a first key-map file for the participant that includes a first set of keys that enables the participant to have the second type of access to the version of the secure content-part following the key reset point, wherein the first set of keys are unable to provide any access to the version of the secure content-part prior to the key reset point.

15. A non-transitory computer readable storage medium on which is embedded a computer program, said computer program implementing a method for managing access to a secure content-part of a publicly posted composite document (PPCD) by workflow participants, said computer program comprising a set of instructions to:
determine a key reset point of the secure-content part during a workflow among the workflow participants to be a key reset point;
generate, in a secure environment, a plurality of key-map files comprising subsets of access keys that provide access to the secure content-part during respective content access sessions, wherein at least one of the plurality of key-map files corresponds to the key reset point, and wherein the at least one of the plurality of key-map files comprises a first decryption key, a first verification key, a second encryption key, and a second signature key, wherein the first decryption key does not correspond to the second encryption key, wherein the first verification key does not correspond to the second signature key;
encrypt the plurality of key-map files using respective symmetric keys;
encrypt the symmetric keys using respective public keys of the workflow participants; and
supply the PPCD and the plurality of key-map files to at least one of the workflow participants outside of the secure environment without the at least one of the workflow participants being granted access to the secure environment.

* * * * *